(12) United States Patent
Rochford et al.

(10) Patent No.: US 6,762,727 B2
(45) Date of Patent: Jul. 13, 2004

(54) QUICK-ATTACH, SINGLE-SIDED AUTOMOTIVE ANTENNA ATTACHMENT ASSEMBLY

(75) Inventors: Glen Brian Rochford, Pelham, NH (US); A. David Kozlovski, Atkinson, NH (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/972,807

(22) Filed: Oct. 9, 2001

(65) Prior Publication Data

US 2003/0067182 A1 Apr. 10, 2003

(51) Int. Cl.⁷ ................................................ H01Q 1/32
(52) U.S. Cl. ........................................ 343/713; 24/289
(58) Field of Search ................................. 343/715, 713, 343/878, 888; 24/289–297; 411/54, 508–510, 913; 403/187

(56) References Cited

U.S. PATENT DOCUMENTS

| | | | |
|---|---|---|---|
| 2,265,179 A | 12/1941 | MacDonald | 285/6.5 |
| 2,392,491 A | 1/1946 | Moran | 85/2.4 |
| 2,496,938 A * | 2/1950 | Friedman | 343/888 |
| 2,727,766 A | 12/1955 | Grashow | 287/20 |
| 2,896,010 A | 7/1959 | Newman | 174/153 |
| 3,138,660 A * | 6/1964 | Cejka | 343/888 |
| 3,138,661 A * | 6/1964 | Grashow | 343/888 |
| 3,343,441 A | 9/1967 | Van Buren, Jr. | 85/70 |
| 4,136,986 A * | 1/1979 | Grashow | 343/888 |
| 4,237,768 A | 12/1980 | Volkmann | 85/73 |
| 4,773,280 A | 9/1988 | Baumgarten | 403/197 |
| 5,507,585 A | 4/1996 | Diederich et al. | 403/349 |
| 5,567,074 A | 10/1996 | Dovak et al. | 403/197 |
| 5,624,130 A | 4/1997 | Ricks | 280/728.2 |
| 6,236,377 B1 | 5/2001 | Hussaini et al. | 343/882 |
| 6,453,796 B1 | 9/2002 | Rocquet | 92/161 |
| 6,486,841 B1 * | 11/2002 | Imahigashi | 343/715 |
| 2003/0068198 A1 | 4/2003 | Kozlovski | 403/372 |

FOREIGN PATENT DOCUMENTS

| | | | |
|---|---|---|---|
| DE | 196 40 110 A1 | 4/1998 | B60R/11/00 |
| EP | 1 120 853 A1 | 8/2001 | H01Q/1/22 |
| FR | 2 584 871 | 1/1987 | H01Q/1/32 |
| FR | 2 771 858 | 6/1999 | H01Q/1/32 |

OTHER PUBLICATIONS

International Search Report, International application No. PCT/US 02/32162, International filing date Aug. 10, 2002.

* cited by examiner

Primary Examiner—Michael C. Wimer

(57) ABSTRACT

An attachment assembly provides quick attachment of an automotive antenna unit or other object to the exterior of a vehicle. A single worker is able to install the antenna unit or other object with one downward push from the exterior without the need for tools. The attachment assembly also includes an anti-rotation feature to prevent rotation. The attachment assembly can only be removed from the interior, rendering the attachment assembly tamper resistant from the exterior. The attachment assembly can also be mounted on vehicles with various panel thicknesses.

30 Claims, 4 Drawing Sheets

QUICK-ATTACH, SINGLE-SIDED AUTOMOTIVE ANTENNA ATTACHMENT ASSEMBLY

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Automobiles and other vehicles typically include an antenna mounted on the body of the vehicle. The antenna includes a housing unit that mounts to the exterior with an attachment that extends through an opening to the interior of the vehicle. In the installation of the antenna, an automotive assembly worker must work in a confined space in the interior of the vehicle and must use one or more tools. In some cases, assistance from another worker is also required.

SUMMARY OF THE INVENTION

The present invention provides an attachment assembly that provides quick attachment of an automotive antenna unit or other object to the exterior of a vehicle. A single worker is able to install the antenna unit or other object with one downward push from the exterior through an opening in the vehicle panel without the need for tools. The attachment assembly also includes an anti-rotation feature to prevent rotation once installed. The attachment assembly can only be removed from the interior, rendering the attachment assembly tamper resistant from the exterior. The attachment assembly can also be mounted on vehicles with various panel thicknesses.

More particularly, the attachment assembly includes a base assembly fixed to a lower surface of the object. The base assembly includes a shaft member that extends through the opening in the vehicle panel. An expandable member on the shaft member includes a plurality of resilient members that abut against an interior surface of the panel. The resilient members are compressible to pass through the opening in the panel during installation. A retaining member retains the expandable member on the shaft member with the resilient members in abutment with the interior surface of the panel after installation. A spacer member also disposed on the shaft member biases the expandable member against the retaining member with a gap between the expandable member and the lower surface of the object. The gap is sized to receive the panel of the vehicle after the installation procedure. In this way, panels of various thicknesses can be accommodated by an appropriately sized spacer member. If necessary, a final adjustment can be made to the retaining member after installation. A keying feature is provided between the expandable member and the base assembly to prevent rotation of the attachment assembly.

DESCRIPTION OF THE DRAWINGS

The invention will be more fully understood from the following detailed description taken in conjunction with the accompanying drawings in which.

DETAILED DESCRIPTION OF THE INVENTION

Figure 1:
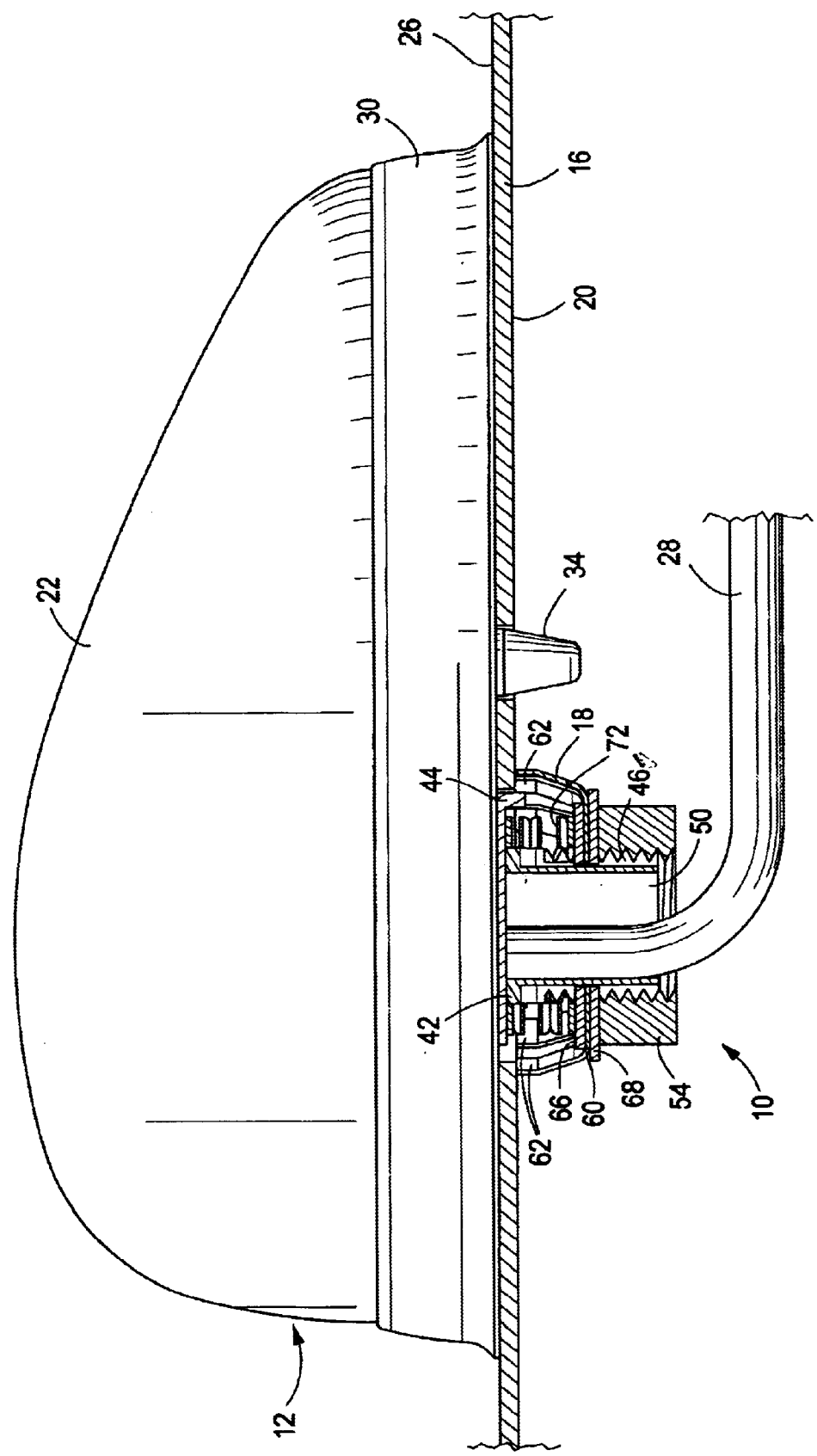
FIG. 1 is a side view of an automotive attachment assembly in conjunction with an antenna unit according to the present invention.
Figure 2:
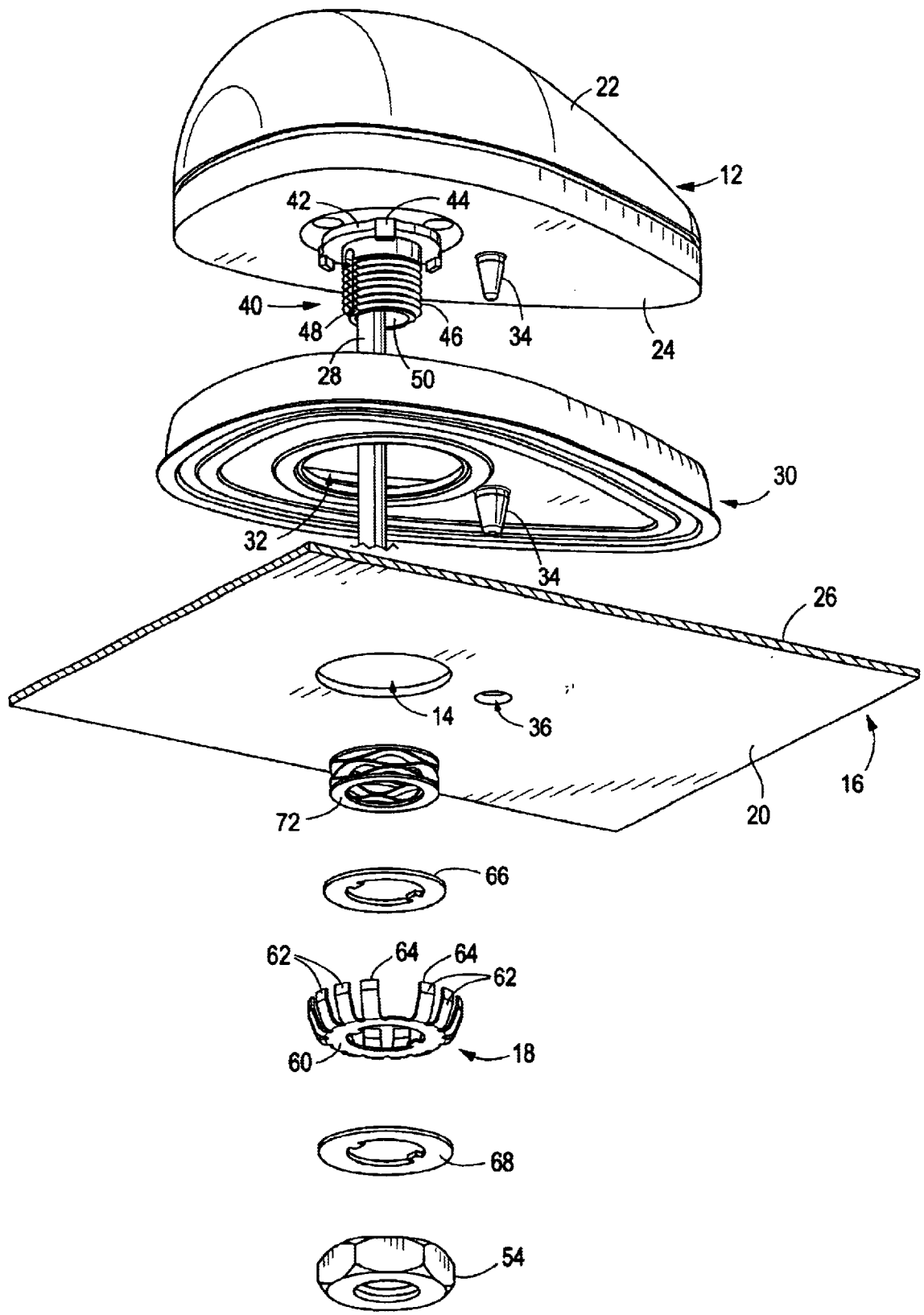
FIG. 2 is an exploded view of the attachment assembly and antenna unit of FIG. 1.
Figure 3:
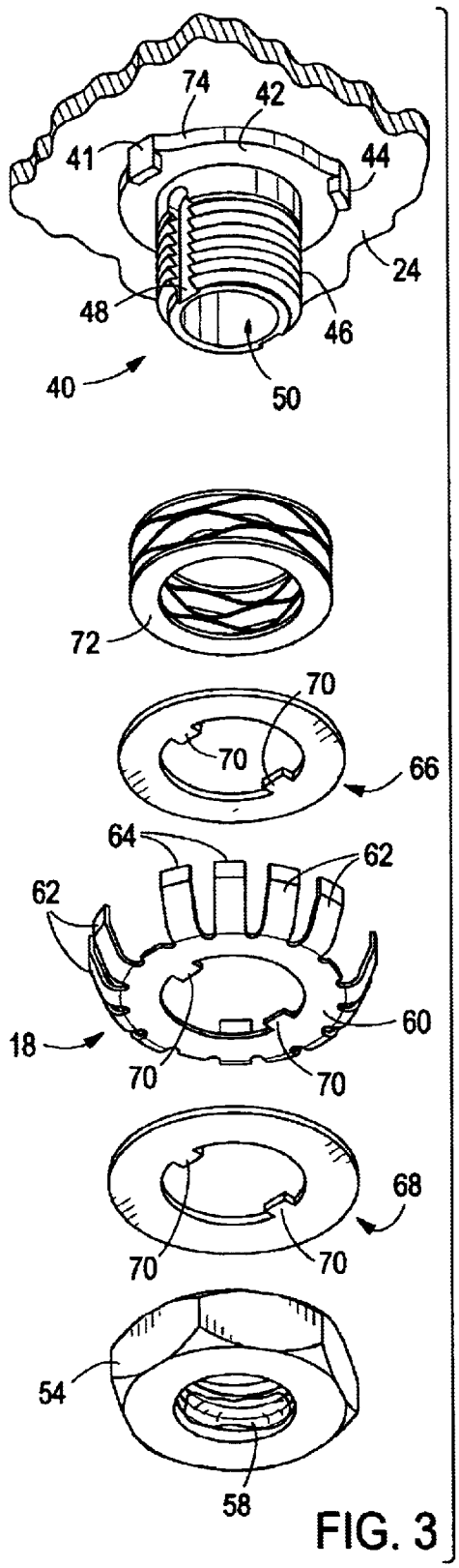
FIG. 3 is an exploded view of the attachment assembly of FIG. 1.
Figure 4:
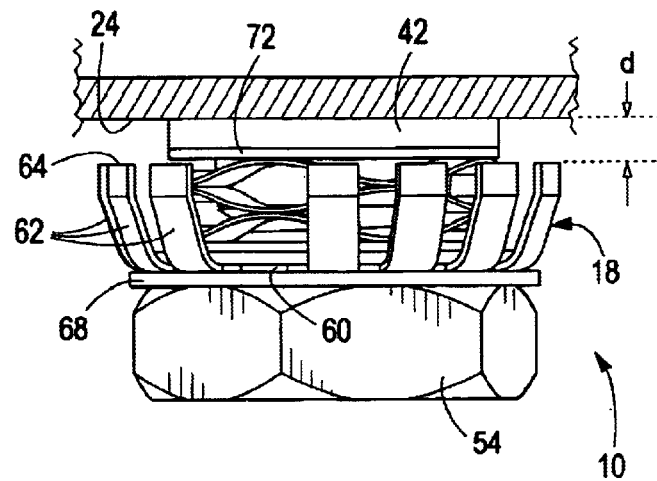
FIG. 4 is a side view of the attachment assembly of FIG. 1.
Figure 5:
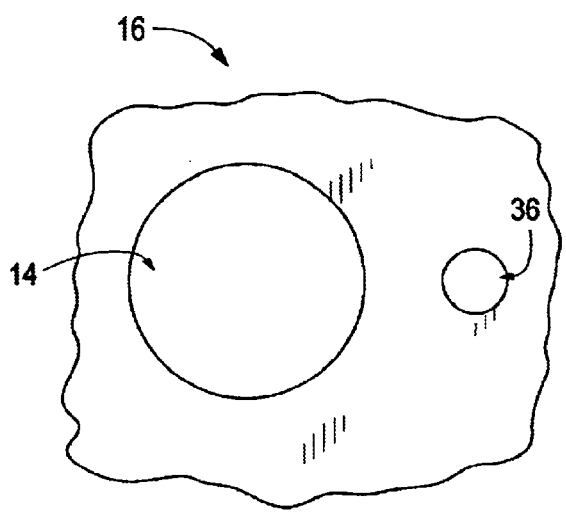
FIG. 5 is a cutaway plan view of a vehicle panel for use with the attachment assembly and antenna unit of FIG. 1.

An antenna attachment assembly 10 according to the present invention is illustrated more fully in FIGS. 1–5 in conjunction with an antenna unit 12. The attachment assembly 10 is fixed to and extends from the antenna unit 12 and extends through an opening 14 in a panel 16 of a vehicle body. The attachment assembly 10 includes an expandable member 18 that is biased against the interior surface 20 of the panel 16, thereby fixing the attachment assembly 10 and antenna unit 12 to the vehicle, as discussed further below.

In the illustrated embodiments, the antenna unit 12 is illustrated as a radome cover 22 for a GPS or satellite antenna. It will be appreciated that the attachment assembly of the present invention may be used with any type of antenna and associated cover or base unit, such as an AM/FM antenna, or with any other device or object that is intended to be affixed to an exterior panel of the vehicle.

In the illustrated embodiment, the unit 12 has a lower surface 24 that is supported on the exterior surface 26 of the vehicle panel 16 over the opening 14 in the panel. A cable 28 from the unit 12 extends through the lower surface 24 of the unit and through the opening 14 in the panel 16 for connection to other components within the vehicle, as known in the art. A perimeter gasket 30 with an opening 32 therein fits between the lower surface 24 of the unit 12 and the exterior surface 26 of the panel 16. The gasket 30 seals the opening 14 against leaks and compensates for thickness and contour fluctuations in the panel 16. Keying features 34 extend from the unit 12 and the gasket 30 into a smaller opening 36 in the panel 16, as known in the art.

In a first embodiment, the attachment assembly 10 includes a base assembly 40 that is fixed to and extends from the lower surface 24 of the antenna unit 12. The base assembly 40 includes a base plate 42 having a plurality of radially extending tabs 44 located about the circumference of the base plate. The tabs fit within the opening 14 in the panel 16. Three tabs 44 are suitable, although any desired number may be used. The base assembly 40 may be integral with or fixed to the unit 12 in any suitable manner, such as with screws or adhesive. The base assembly 40 also includes an externally threaded hollow shaft 46 extending downwardly from the base plate 42. The shaft includes one or more key slots 48 along its length, discussed further below. The cable 28 from the unit 12 passes through the hollow interior 50 of the shaft 46.

When installed on a vehicle, the base assembly 40 extends through the opening 14 in the panel 16. The expandable member 18, such as a snap ring, fits over the externally threaded shaft 46. A retaining member 54, such as an internally threaded jam nut, retains the expandable member 18 on the base assembly and biases the expandable member against the interior surface 20 of the panel 16. The nut preferably includes a self-locking fastener element 58, such as a polyester or nylon element, applied to the threads at an interior location to prevent slippage, as known in the art. The fastener element should not impede engagement of the nut onto the threads of the shaft.

In the embodiment shown, the snap ring comprises an annular washer portion 60 and a plurality of upstanding, resilient members such as fingers 62 that, in the installed position, expand radially outwardly and at their tips 64 press against the interior surface 20 of the panel 16. The snap ring is preferably stamped and formed from a sheet material having a thickness, hardness, and other properties selected to provide an appropriate amount of resiliency to the fingers, as may be readily determined by those of skill in the art. A metal material, such as a 30 gage stainless steel, is suitable, although an appropriate plastic or composite material may be used if desired. Preferably, a stability washer 66 is provided above and an anti-torsion washer 68 is provided below the annular washer portion 60 to stiffen and support the washer portion and protect the washer portion from distortion. Generally, the washers are stamped from a thicker sheet material than the snap ring, such as a 20 gage stainless steel. Both washers and the snap ring include one or more inwardly facing tabs or keys 70 that align with and fit within the key slots 48 on the threaded shaft 46. When fitted within the key slots, the keys prevent the expandable member 18 from rotating with respect to the unit 12.

The attachment assembly also includes a spacer member 72 such as a compression spring that allows for multiple preset distances to accommodate various panel thicknesses. The compression spring exerts a downward bias on the snap ring against the upward force exerted by the jam nut. The height of the compression spring is set by tightening the jam nut so as to achieve the desired distance or gap (d) between the top of the snap ring fingers and the base plate. Upon installation, the vehicle panel fits within this gap. If necessary, the size of the compression spring may be selected to achieve the desired gap size, depending on the thickness of the panel.

Assembly requires a downward push of the antenna unit 12 and the attachment assembly 10 through the opening 14 in the panel 16. As the attachment assembly is inserted through the opening in the panel, the resilient fingers 62 of the snap ring compress radially inwardly. The tips 64 of the fingers extend within arcuate regions 74 between the tabs 44 of the base plate 42. Once the snap ring passes fully through the opening 14, the fingers spread radially outwardly. The tips of the fingers, which are preferably bent inwardly, abut against the interior surface 20 of the panel 16, thereby locking the attachment assembly place. If necessary, any final adjustments can be made by rotating the jam nut.

Figure 6:
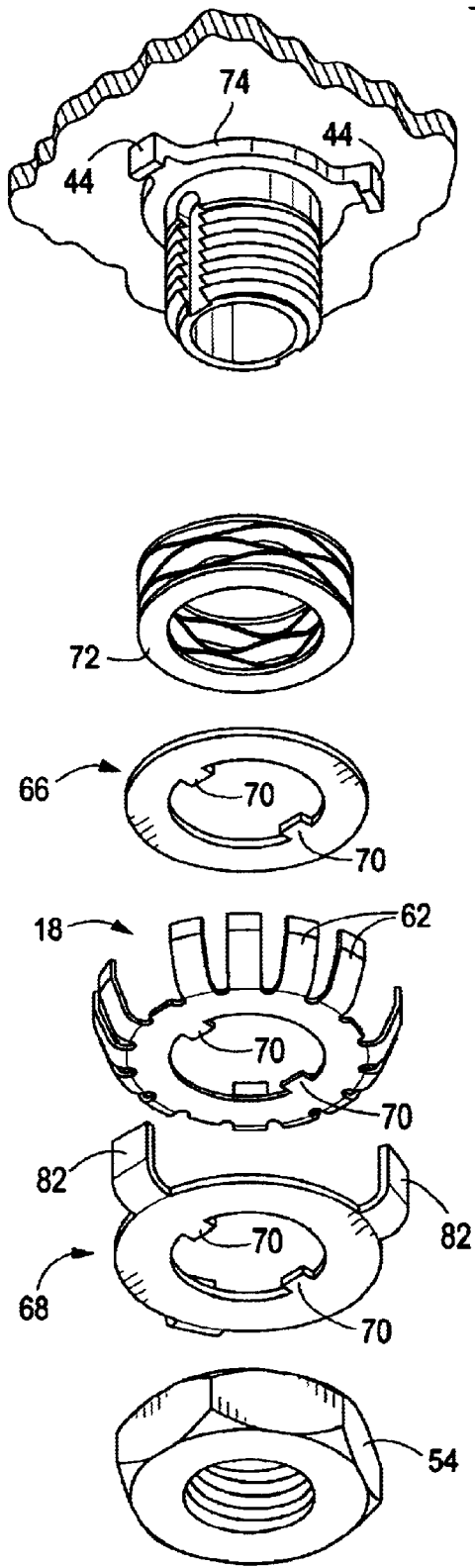
FIG. 6 is an exploded view of a further embodiment of an attachment assembly.
Figure 7:
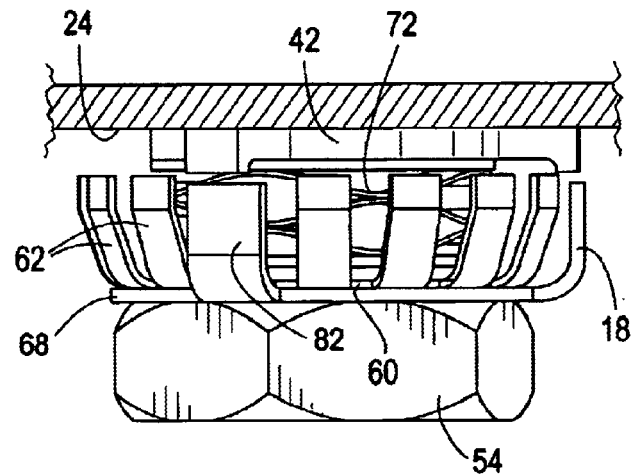
FIG. 7 is a side view of the attachment assembly of FIG. 6.
Figure 8:
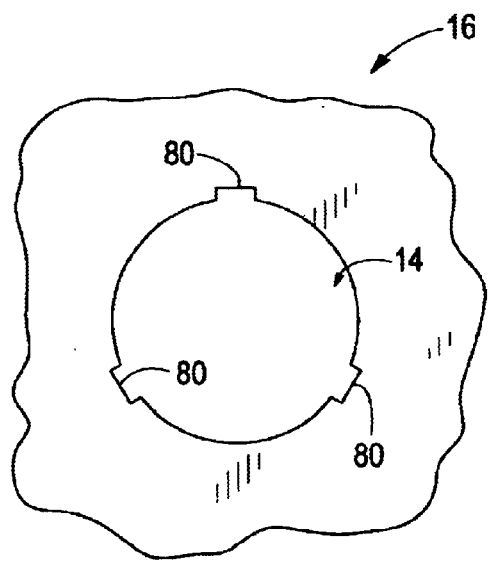
FIG. 8 is a cutaway plan view of a vehicle panel for use with the attachment assembly of FIG. 6.

In a further embodiment, illustrated in FIGS. 6–8, a further anti-rotation keying mechanism is provided. The opening 14 in the panel 16 includes one or more recesses 80 spaced to provide a single orientation. The radially extending tabs 44 on the base plate 42 are aligned with the recesses 80. The tabs fit within the recesses to prevent rotation of the assembly within the opening. Upstanding arms 82 are provided on the lower anti-torsion washer to guide the attachment assembly through the opening 14 during installation. The anti-rotation keying mechanism may be provided in place of or in addition to the keying features 34 utilizing the second opening 36 provided with the antenna unit 12.

It will be appreciated that other variations of the above embodiments are possible. For example, the expandable member and the retaining member may be formed as an integral member. The invention is not to be limited by what has been particularly shown and described, except as indicated by the appended claims.

What is claimed is:

1. An attachment assembly for attaching an object to a panel of a vehicle, the panel having a determined thickness, comprising:

a base assembly fixable to a lower surface of the object to extend from the lower surface, comprising a base plate sized to fit within an opening in the panel and a shaft member depending from the base plate;

an expandable member disposed on the shaft member, the expandable member comprising a plurality of resilient members disposed to abut against an interior surface of the panel, the resilient members compressible to pass through the opening in the panel during an installation procedure;

a retaining member disposed on the shaft member and retaining the expandable member on the shaft member for abutment of the resilient members with the interior surface of the panel after the installation procedure; and a spacer member disposed on the shaft member and biasing the expandable member against the retaining member with a gap between the expandable member and the lower surface of the object sized to receive the panel of the vehicle after the installation procedure.

2. The attachment assembly of claim 1, wherein the shaft member comprises a keying feature and the expandable member comprises a corresponding keying feature disposed to cooperatively engage with the keying feature of the shaft member to prevent rotation of the attachment assembly about an axis of the shaft member.

3. The attachment assembly of claim 2, wherein the keying feature on the shaft member comprises at least one slot formed on the shaft member and the corresponding keying feature on the expandable member comprises at least one tab configured to fit within the slot on the shaft member.

4. The attachment assembly of claim 1, further comprising a stability washer disposed between the expandable member and the spacer member.

5. The attachment assembly of claim 1, further comprising an anti-torsion washer disposed between the expandable member and the retaining member.

6. The attachment assembly of claim 1, wherein the shaft member is externally threaded and the retaining member comprises a nut threadable on the shaft member.

7. The attachment assembly of claim 1, wherein the spacer member comprises a compressible spring member.

8. The attachment assembly of claim 1, wherein the base plate is sized to conform to the opening in the vehicle panel.

9. The attachment assembly of claim 1, wherein the base plate includes radially extending tab members sized to conform to the opening in the vehicle panel.

10. The attachment assembly of claim 9, wherein the base plate further includes circumferential spaces defined between the radially extending tab members, the resilient members of the expandable member disposed to fit within the circumferential spaces when compressed during the installation procedure.

11. The attachment assembly of claim 9, wherein the tab members are configured to engage the opening in the panel in a single orientation to provide a keying of the object with respect to the vehicle panel.

12. The attachment assembly of claim 1, wherein the resilient members comprise upstanding fingers.

13. The attachment assembly of claim 1, wherein the expandable member comprises an annular portion, the resilient members upstanding from the annular portion.

14. The attachment assembly of claim 1, wherein the object is an antenna unit.

15. The attachment assembly of claim 14, wherein the antenna unit includes a global positioning system (GPS) antenna, or a satellite antenna, or an AM/FM antenna.

16. A quick-attaching object for attachment to an automobile through an opening in an exterior panel of the automobile, comprising:

an object to be attached to the exterior panel of the automobile, the object comprising a lower surface disposed to be supported on the exterior surface of the exterior panel;

a base assembly fixed to and extending from the lower surface of the object, comprising a base plate sized to fit within the opening in the exterior panel and a shaft member depending from the base plate;

an expandable member disposed on the shaft member, the expandable member comprising a plurality of resilient members disposed to abut against an interior surface of the exterior panel, the resilient members compressible to pass through the opening in the exterior panel during an installation procedure; and a retaining member disposed on the shaft member and retaining the expandable member on the shaft member for abutment with the interior surface of the exterior panel after the installation procedure;

wherein the shaft member comprises a keying feature and the expandable member comprises a corresponding keying feature disposed to cooperatively engage with the keying feature of the shaft member to prevent rotation of the expandable member relative to the object.

17. The quick-attaching object of claim 16, wherein the keying feature on the shaft member comprises at least one slot formed on the shaft member and the corresponding keying feature on the expandable member comprises at least one tab configured to fit within the slot on the shaft member.

18. The quick-attaching object of claim 16, further comprising an anti-torsion washer disposed between the expandable member and the retaining member.

19. The quick-attaching object of claim 16, wherein the shaft member is externally threaded and the retaining member comprises a nut threadable on the shaft member.

20. The quick-attaching object of claim 16, wherein the resilient members comprise upstanding fingers.

21. The quick-attaching object of claim 16, wherein the object to be attached comprises an antenna unit.

22. The quick-attaching object of claim 16, wherein the object to be attached includes a gasket sized to seal around the opening in the vehicle panel.

23. A method of attaching the quick-attaching object of claim 16 to an exterior of a vehicle comprising:

providing the quick-attaching object;

providing an opening in the exterior of the vehicle; and inserting the attachment assembly of the quick-attaching object into the opening from the exterior.

24. A quick-attaching object for attachment to an automobile through an opening in an exterior panel of the automobile, comprising:

an object to be attached to the exterior panel of the automobile, the object comprising a lower surface disposed to be supported on the exterior surface of the exterior panel;

a base assembly fixed to and extending from the lower surface of the object, comprising a base plate sized to fit within the opening in the exterior panel and a shaft member depending from the base plate;

an expandable member disposed on the shaft member, the expandable member comprising a plurality of resilient members disposed to abut against an interior surface of the exterior panel, the resilient members compressible to pass through the opening in the exterior panel during an installation procedure;

a retaining member disposed on the shaft member and retaining the expandable member on the shaft member for abutment with the interior surface of the exterior panel after the installation procedure; and a spacer member disposed on the shaft member and biasing the expandable member against the retaining member with a gap between the expandable member and the lower surface of the object sized to receive the exterior panel after the installation procedure.

25. The quick-attaching object of claim 24, further comprising a stability washer disposed between the expandable member and the spacer member.

26. The quick-attaching object of claim 24, wherein the spacer member comprises a compressible spring member.

27. The quick-attaching object of claim 24, wherein the base plate is sized to conform to the opening in the vehicle panel.

28. The quick-attaching object of claim 24, wherein the base plate includes radially extending tab members sized to conform to the opening in the exterior panel.

29. The quick-attaching object of claim 28, wherein the base plate further includes circumferential spaces defined between the radially extending tab members, the resilient members of the expandable member disposed to fit within the circumferential spaces when compressed during the installation procedure.

30. The quick-attaching object of claim 28, wherein the tab members are configured to engage the opening in the panel in a single orientation to provide a keying of the object with respect to the exterior panel.

* * * * *